(12) United States Patent
Lin

(10) Patent No.: US 7,464,637 B1  
(45) Date of Patent: Dec. 16, 2008

(54) INSULATED BREWING POT FOR COFFEE OR TEA

(76) Inventor: Shin-Shuoh Lin, 27022 Falling Leaf Dr., Laguna Hills, CA (US) 92653

(*) Notice: Subject to any disclaimer, the term of this patent is extended or adjusted under 35 U.S.C. 154(b) by 625 days.

(21) Appl. No.: 11/131,878

(22) Filed: May 19, 2005

(51) Int. Cl.  
*A47J 31/06* (2006.01)  
*A47J 31/00* (2006.01)

(52) U.S. Cl. .............. 99/322; 99/317; 99/323; 99/323.3

(58) Field of Classification Search .......... 99/322, 99/317, 321, 318, 319, 316, 323, 323.3, 413, 99/417; 222/475.1; 220/521, 522, 528, 713, 220/506, 505, 524  
See application file for complete search history.

(56) References Cited

U.S. PATENT DOCUMENTS

| | | | | |
|---|---|---|---|---|
| 240,402 | A | * | 4/1881 | Gee .............................. 99/322 |
| 608,641 | A | * | 8/1898 | Blackwood .................. 99/293 |
| 1,003,428 | A | * | 9/1911 | Brust ........................... 99/319 |
| 1,777,909 | A | * | 10/1930 | Brookes ....................... 99/322 |
| 3,261,494 | A | * | 7/1966 | Walker, Jr. .................. 220/555 |
| 4,277,000 | A | * | 7/1981 | Jaarsma .................... 222/142.4 |
| 4,498,375 | A | | 2/1985 | Bedini |
| 4,919,295 | A | * | 4/1990 | Hitzler ..................... 220/23.83 |
| 4,977,820 | A | | 12/1990 | Lin |
| D336,587 | S | | 6/1993 | Goldstein |
| 5,570,623 | A | | 11/1996 | Lin |
| 5,753,289 | A | * | 5/1998 | Ness ........................... 426/394 |
| 5,947,004 | A | | 9/1999 | Huang |
| 6,732,635 | B2 | | 5/2004 | Jensen et al. |
| 6,913,777 | B2 | * | 7/2005 | Rebhorn et al. ............. 426/394 |

* cited by examiner

*Primary Examiner*—Reginald L Alexander  
(74) *Attorney, Agent, or Firm*—Gordon K. Anderson

(57) ABSTRACT

An insulated pot (10) is taught that is used for brewing coffee or tea which incorporates a container (20) with a handle (22) and a top opening (20'). A top covering member (30), including a pouring spout (32), is removably affixed within the top opening of the container. The top covering member is formed with a crescent shaped opening (34) leaving a double circular segment gap (36) adjacent to crescent shaped opening. A pivotal lid (44) is attached to the top covering member and a removable crescent shaped basket (56) is disposed within the crescent shaped opening. The invention the lid to be hinged open and coffee grounds or tea leafs may be placed in the basket with hot water poured over thereby infusing into a beverage. The brewed coffee or tea accumulates beneath the basket in the pot and when poured from the spout the beverage flows through the double circular segment gap without touching the spent grounds or leafs in the basket.

18 Claims, 4 Drawing Sheets

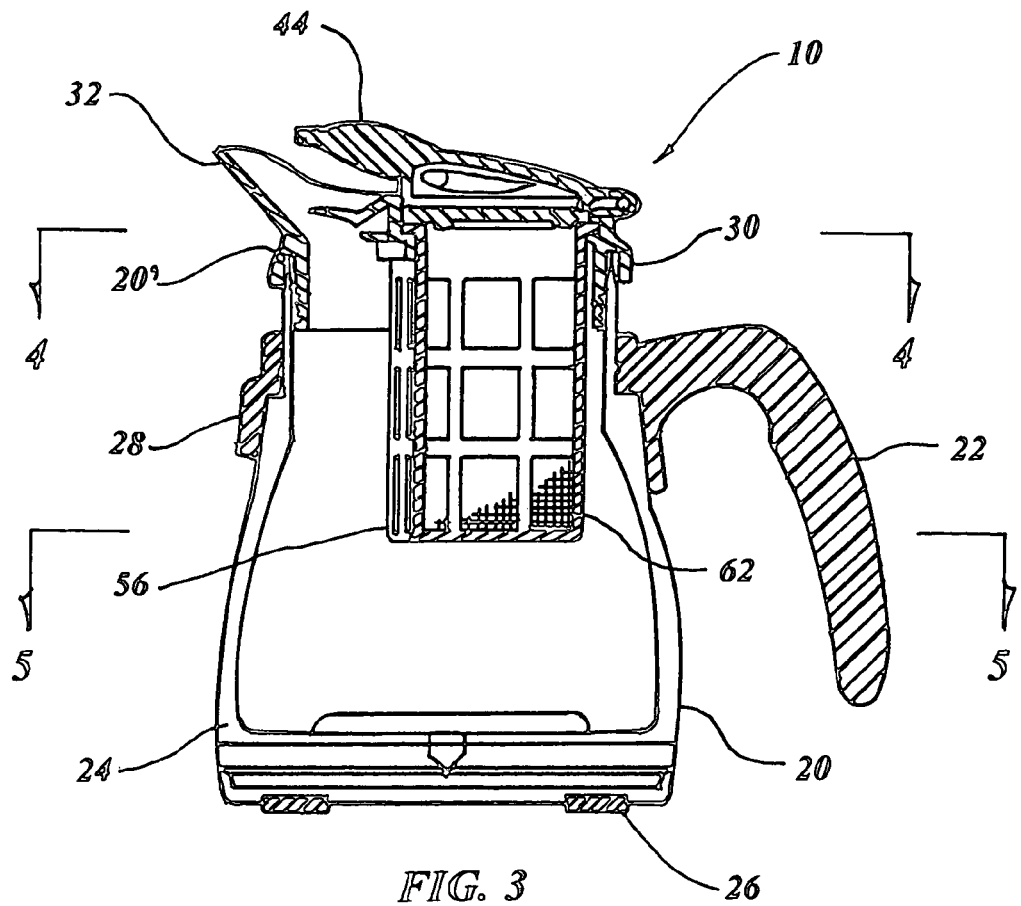
FIG. 3
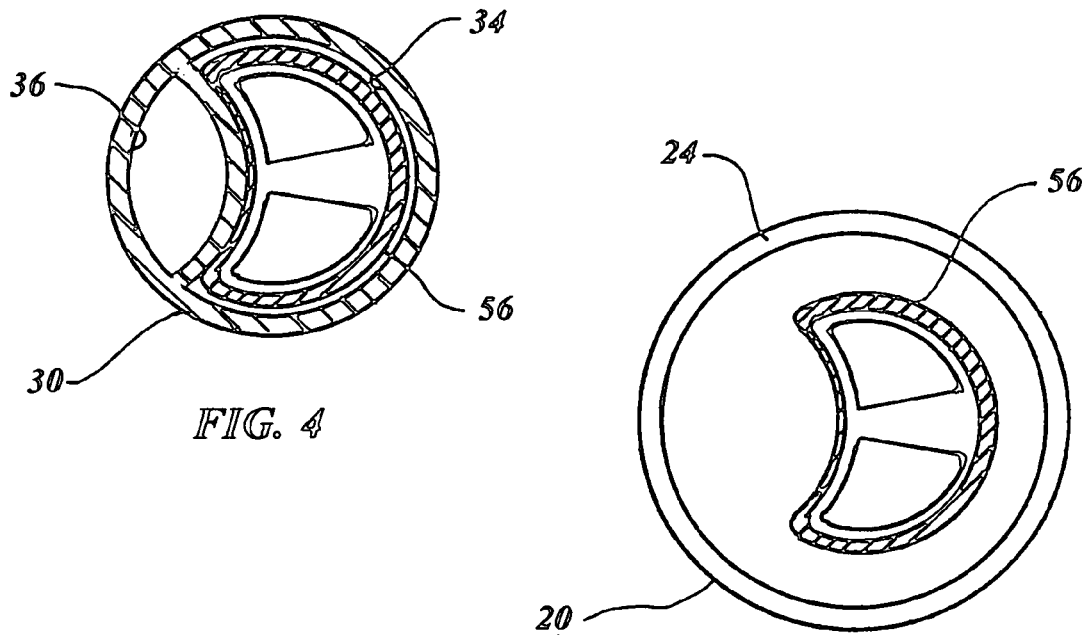
FIG. 4
FIG. 5

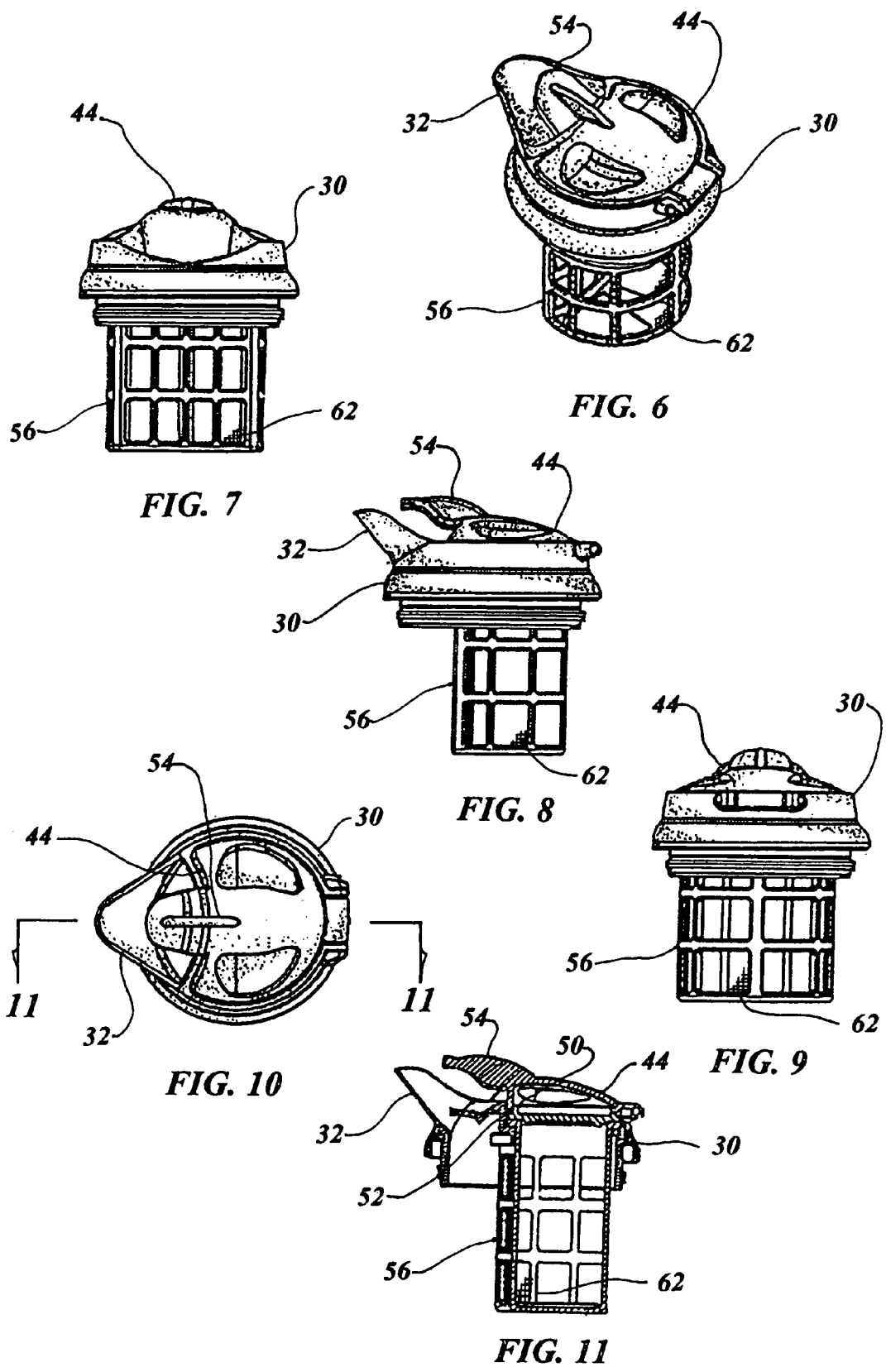

INSULATED BREWING POT FOR COFFEE OR TEA

TECHNICAL FIELD

The present invention relates to coffee and tea pots in general. More specifically to an insulated pot for brewing coffee or tea that is configured to isolate the spent coffee grinds or tea leafs from the brewed beverage and retain the segregation when poured from the pot.

BACKGROUND ART

Previously, many types of pots and containers have been used in endeavoring to provide an effective means to infuse coffee and tea with hot water and separate the grounds and leafs from the brewed beverage. In most cases removal of the spent coffee grinds or tea leafs is required prior to pouring.

The prior art listed below did not disclose patents that possess any of the novelty of the instant invention; however the following U.S. patents are considered related:

| Patent No. | Inventor | Issue Date |
| --- | --- | --- |
| 4,498,375 | Bedini | Feb. 12, 1985 |
| 4,997,820 | Lin | Dec. 18, 1990 |
| Des. 336,567 | Goldstein | Jun. 22, 1993 |
| 5,570,623 | Lin | Nov. 5, 1996 |
| 5,947,004 | Huang | Sep. 7, 1999 |
| 6,732,635 | Jensen et al. | May 11, 2004 |

Bedini in U.S. Pat. No. 4,498,375 teaches an automatic coffee pot having a filter basket with a telescoping tube disposed over a hollow tube in an upper chamber of the pot allowing cream to be poured into the upper chamber for making cappuccino.

U.S. Pat. No. 4,997,820 issued to Lin is for a brewer that includes a container having an open upper end and a smaller sized retainer cup having a flange on top with two notches therein. Holes are formed in the retainer and the notches are engageable with one side of the container to support the retainer cup after hot water has been poured over the coffee grinds or tea leafs that have been placed in the retainer allowing the brewed liquid to drain into the container.

Lin in U.S. Pat. No. 5,570,623 teaches a heat retaining coffee pot having a tubular housing into which a hollow thermal insulating jacket is received with a glass container disposed in the jacket. A lid is fitted in the top of the tubular housing and consists of an outer and inner cover. A filter unit has a bottom portion and top portion with a mediate portion slideably extending through the lid.

Huang in U.S. Pat. No. 5,947,004 discloses a device for infusing tea and coffee that consists of a container, a first inner cup suspended in the container and a second inner cup suspended in the first cup covered with a lid. The second inner cup incorporates a filter and a stopper in a center portion when hot water is poured over the coffee or tea infusion takes place and drains into the container. The second inner cup is rotated and the passage is closed with a stopper placed therein.

U.S. Pat. No. 6,732,635 issued to Jensen et al. is for a coffee pot having a strainer bag extending into the pot. Ground coffee is poured into the pot and then hot water is poured there over allowing extraction to take place in the pot. When the brewed coffee is poured out the grounds are retained by the strainer bag For background purposes and as indicative of the art to which the invention is related reference may be made to the remaining cited Design Pat. No. Des. 336.567 issued to Goldstein.

DISCLOSURE OF THE INVENTION

Coffee and tea pots have been used for centuries to brew coffee or tea and have been employed by pouring hot water over the coffee grinds or tea leafs allowing the water to infuse and extract the flavor and body from the product. A later improvement provided some type of straining means located near the neck opening permitting the brewing to take place without having to sift the remaining grinds or leafs from the beverage. This improvement was advantageous but required removing the straining device prior to pouring. It is therefore the primary object of the invention is to not only isolate the spent coffee grinds or tea leafs such that they do not touch the brewed beverage but also permit pouring the brewed liquid without touching the spent coffee grinds or tea leafs.

An important object of the invention makes it possible to leave spent coffee grinds or tea leafs within the pot thus preventing successive cups from being bitter due to excessive seeping and yet allows the liquid beverage to be poured without any manipulation of the pot or the necessity of removing a straining device.

Another object of the invention is that the pot is made of strong robust stainless steel using a double wall construction which permits a vacuum to be pulled between the walls providing an efficient insulation between the prevailing ambient and the contents of the pot. The hinged pivotal lid is also of the double wall construction however a dead air space is employed for insulation which is sufficient as the lid only utilizes a small surface area relative to the remainder of the pot.

Still another object of the invention is the ease of cleaning since a removable basket is employed which is easily removed for cleaning and may be detached by simply lifting out and cleansed at any convenient time.

Yet another object of the invention is in the configuration of the cover which snaps in place when closed thus preventing contaminants from entering the pot.

A further object of the invention is in the provision that the basket may be completely removed from the pot if other utility is required such as being use as a pitcher for milk, cream or other liquid that requires insulation from the surrounding atmosphere.

A final object of the invention is that the pot is shaped with wide base to prevent tipping and a resilient pad is attached to the bottom surface of the pot to prevent damage to the bottom when the pot is resting on a flat surface or slipping when on an inclined surface.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a cross sectional view of the preferred embodiment taken along the vertical centerline at the handle and pouring spout plane.

FIG. 4 is a cross sectional view taken along lines 4-4 of FIG. 3.

FIG. 5 is a cross sectional view taken along lines 5-5 of FIG. 3.

FIG. 6 is a partial isometric view of the top covering member including the basket in the preferred embodiment.

FIG. 7 is a front view of the top covering member including the basket in the preferred embodiment.

FIG. 8 is a side view of the top covering member including the basket in the preferred embodiment.

FIG. 9 is a rear view of the top covering member including the basket in the preferred embodiment.

FIG. 10 is a top view of the top covering member including the basket in the preferred embodiment.

FIG. 11 is a cross sectional view taken along lines 11-11 of FIG. 10.

BEST MODE FOR CARRYING OUT THE INVENTION

Figure 1:
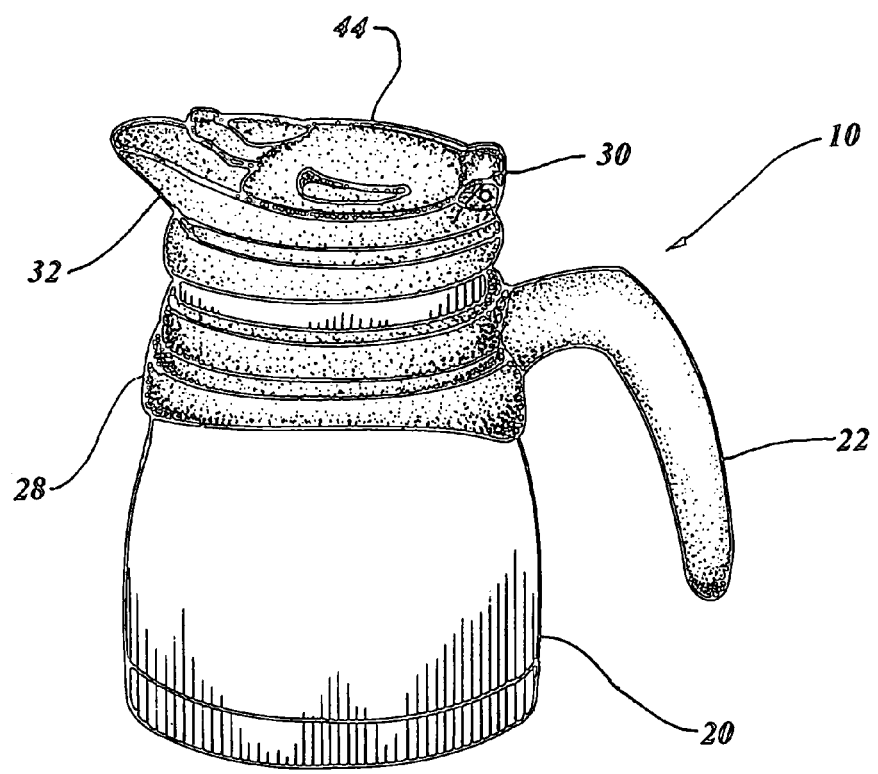
FIG. 1 is a partial isometric view of the insulated pot for brewing coffee or tea in the preferred embodiment.

The best mode for carrying out the invention is presented in terms of a preferred embodiment. This preferred embodiment for the insulated brewing pot 10 is shown in FIGS. 1 thorough 12 and is comprised of a liquid container 20 having a top opening 20' with a handle 22 for lifting and pouring. The container 20 is preferably the stainless steel double wall type of construction for insulation purposes with negative pressure forming a vacuum 24 between the walls creating an insulation barrier minimizing thermal feed-through from the surrounding ambient to the brewed coffee or tea within pot 20. While stainless steel is the preferred material the container 20 may alternatively be formed from a thermoplastic and still function as intended.

A resilient pad 26 is attached to the bottom surface of the container 20 to prevent slipping when the container 20 is resting on an inclined surface or to cushion the container when placed on table or counter top. The container handle 22 includes a circumferential retaining member 28 that surrounding the container 20 supplementing the interface by adding structural strength to the junction between the container 20 and the handle 22. The container 20 is illustrated in FIGS. 1 and 2 also in cross section in FIG. 5.

Figure 2:
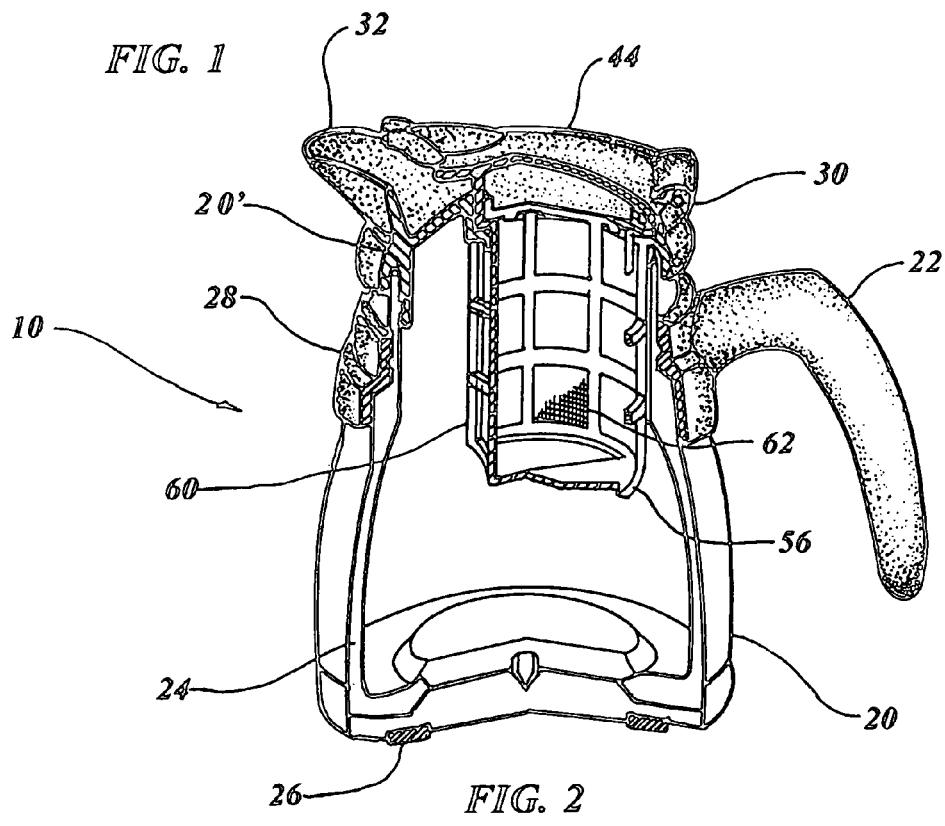
FIG. 2 is a partial cutaway isometric view of the insulated pot for brewing coffee or tea in the preferred embodiment.

A top covering member 30 is removably affixed within the container top opening 20' and includes an integral pouring spout 32 that is located opposite the handle 22, as depicted in FIGS. 1-3. Since the top covering member 30 is basically circular in shape a crescent shaped opening 34 is formed leaving a double circular segment gap 36 adjacent to this crescent shaped opening 34 with the double circular segment gap 36 positioned directly beneath the pouring spout 32 as illustrated best in the cross section of FIG. 4.

The double circular segment gap 36 is in the shape of two circles overlying on top of each other with the intersecting segment where they overlap forming the gap and the crescent shape is formed with one concave edge and one convex edge. Much of the novelty of the invention is based on these shapes as the function of the invention requires a division of two separate areas one for holding coffee grounds or tea leafs and the other for pouring the brewed beverage bypassing the grounds or leafs. While the crescent opening 34 and segment gap 36 are the preferred shape within the round configuration of the container 20 the invention is not limited to such shapes as a circular segment, a circular ring sector, a circular sector, a spherical wedge and a semi-circle or the like may equally function within the parameters of the invention.

The top covering member 30 has a circumferential groove 38 therein with an O-ring sealing ring 40 disposed within the groove 38 forming a resilient hermetic seal between the top covering member 30 and the container 20 permitting repeated removal and replacement of the member 30 while retaining the necessary hermetic seal. The O-ring sealing ring 40 is preferably made with a silicone construction formulation however other materials may be used with equal ease provided they are compatible with the beverages, sanitary regulations and government mandated requirements.

FIGS. 6-11 illustrate the top covering member 30 with its circumferential groove 38 and O-ring sealing ring 40. FIG. 13 also shows an exploded view of the above components it will be noted that a skirt 42 is depicted as a separate element which is permanently affixed to the covering member 30 but manufactured independently.

A pivotal lid 44 is attached to the top covering member 30 for enclosing the container 20 at the top. The pivotal lid 44 includes a hinged joint that incorporates an axis hinge pin 46 that cooperatively extends through a pair of opposed fingers 48 integrally formed within the top covering member 30 forming the pivotal joint. The axis hinge pin 46 may be any type of cylindrical dowel however a stainless metallic roll pin is preferred.

The top pivotal lid 44 includes a lid tab 50 on an edge opposite the hinge joint and a tab recess 52 is formed within the crescent shaped opening 34. The lid tab 50 is snapping into place into the tab recess 52 locking the lid closed.

A gusset reinforced lifting lip 54 is located in the same proximity as the top covering member pouring spout 32 with its integrally formed gusset furnishing supplementary structural strength when the lid 44 is repeatedly raised with the lifting lip 54 to obtain access within the pot 10.

A removable crescent shaped basket 56 is disposed within the crescent shaped opening 34 of the top covering member 30 such that with the lid hinged open, coffee grounds or tea leafs may be placed therein and hot water poured thereupon brewing a beverage that accumulates beneath the basket in the pot. When the beverage is poured from the spout the beverage flows through the double circular segment gap 36 and out of the pouring spout 32 without touching the spent coffee grounds or tea leafs within the basket 56.

The basket includes a peripheral flange 58 on its top surface for retaining the basket when resting said crescent shaped opening 34. The basket 56 is formed to include a structural matrix 60 in the shape of a plurality of windows, with the inside of the matrix windows covered with a strainer 62 positioned inside basket 56 and is sealed directly to the structural matrix 60. The basket strainer 62 is preferably a woven thermoplastic screen having a mesh opening sufficiently small to filter out coffee grounds and tea leafs.

Figure 12:
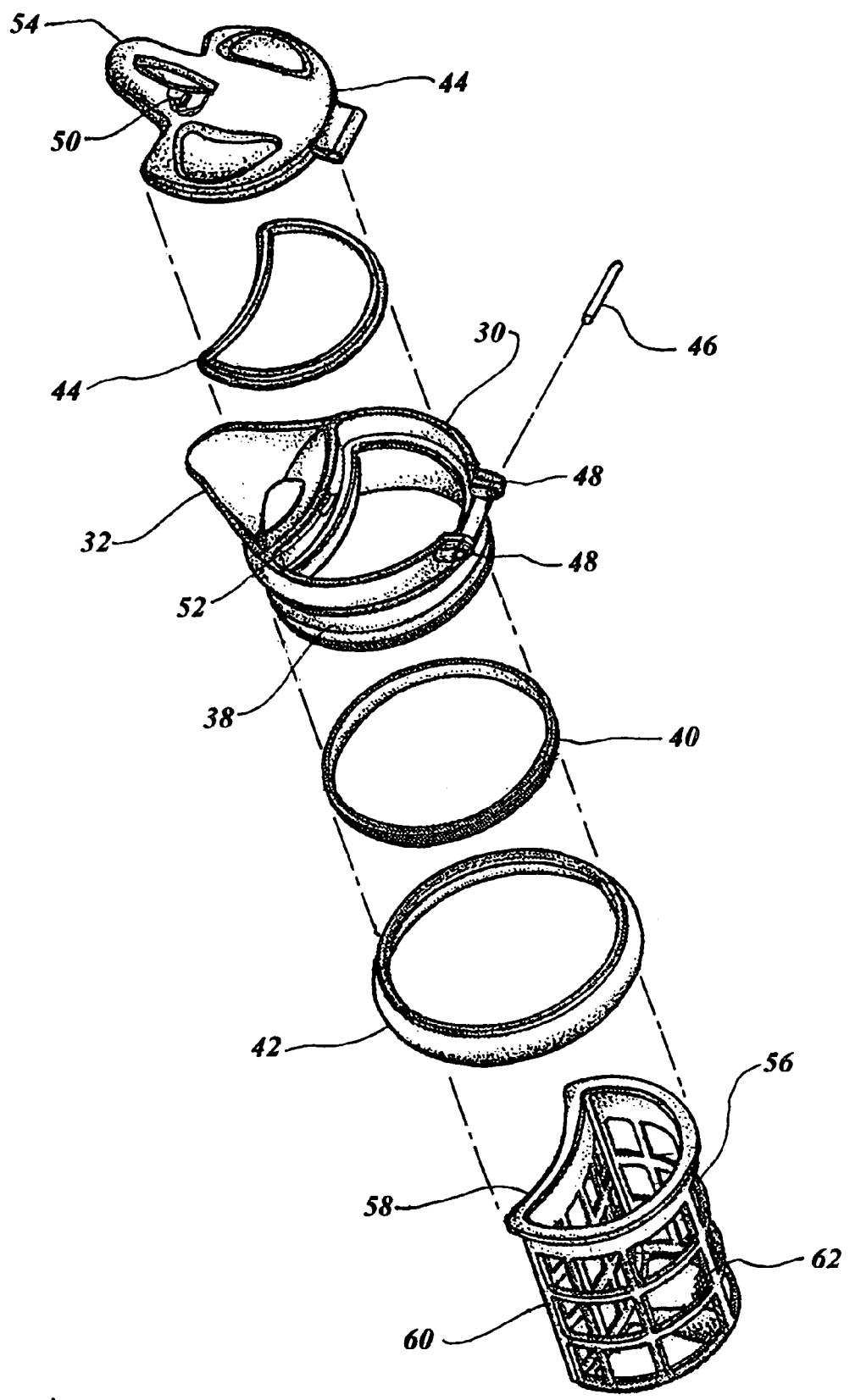
FIG. 12 is an exploded partial isometric view top covering member including the basket in the preferred embodiment.

The basket 56 is illustrated mounted inside of the top covering member 30 in FIGS. 6-11 and alone in the exploded view of FIG. 12. It will be noted that the strainer 62 covers all of the windows in the structural matrix 60 however the drawings illustrate only a representative enlarged segment in FIGS. 2 and 3 since it is woven with a tight mesh and would reproduce as an opaque image due to the scale of the drawings.

The handle 22, top covering member 30, lid 44 and basket 56 are preferably formed of thermoplastic such as polypropylene, acrylic, allyl diglycol carbonate, polycarbonate, polystyrene, polysulfone, polyester sulfone or polyester with the favored material being polypropylene.

In use the lid 44 is raised and coffee grounds or tea leafs are placed in the basket 56 and hot water is poured gently over the grounds or leafs permitting the then brewed beverage to accumulate in the bottom of the pot 10 and the lid 44 is then closed. When the beverage is to be poured into a cup the user grips the handle 22 and pours the liquid into the cup through the pouring spout 32 which by virtue of the configuration completely separates the liquid tea or coffee from the grounds or leafs.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. An insulated pot for brewing coffee or tea comprising,
    a liquid container having a handle for lifting and pouring and a top opening,
    a top covering member removably affixed within said top opening of said container, the top covering member having;
        an integral pouring spout opposite said handle, and
        a crescent shaped opening leaving a double circular segment gap adjacent to crescent shaped opening with the double circular segment gap directly beneath the pouring spout,
    a pivotal lid attached to said top covering member for enclosing the liquid container, and
    a removable crescent shaped basket disposed within said crescent shaped opening such that with the lid hinged open when coffee grounds or tea leafs are placed therein and hot water is poured thereupon brewing a beverage is achieved accumulating beneath the basket in the container and when poured from the spout the beverage flows through the double circular segment gap without touching the spent coffee grounds or tea leafs within the basket.

2. The insulated brewing pot as recited in claim 1 wherein said container further comprises a double wall construction for insulation purposes.

3. The insulated brewing pot as recited in claim 2 wherein said container having between said walls a negative pressure forming a vacuum creating an insulation barrier minimizing thermal feed-through from the surrounding ambient to the brewed coffee or tea within pot.

4. The insulated brewing pot as recited in claim 1 wherein said container further having a stainless steel construction and thermoplastic handle, top covering member, lid and basket.

5. The insulated brewing pot as recited in claim 1 wherein said container further having a thermoplastic construction.

6. The insulated brewing pot as recited in claim 1 wherein said container further comprising a resilient pad attached to a bottom surface for prevention from slipping when the container is resting on a inclined surface or damage on a flat surface.

7. The insulated brewing pot as recited in claim 1 wherein said container handle further comprises a circumferential retaining member surrounding the container supplementing interface structural strength at a junction with the container.

8. The insulated brewing pot as recited in claim 1 wherein said top covering member having a circumferential groove therein, and an O-ring sealing ring disposed within said circumferential groove forming a resilient hermetic seal between the top covering member and the container.

9. The insulated brewing pot as recited in claim 8 wherein said O-ring sealing ring further comprises a silicone construction.

10. The insulated brewing pot as recited in claim 1 wherein said pivotal lid further comprises a hinged joint having an axis hinge pin corporately extending through said top covering member and said lid forming the pivotal joint with the axis hinge pin defined as a metallic roll pin.

11. The insulated brewing pot as recited in claim 10 wherein said top pivotal lid further comprises a lid tab on an edge opposite the hinge joint, and said top covering member having a tab recess therein with the lid tab snapping into place in the tab recess locking the lid closed.

12. The insulated brewing pot as recited in claim 1 wherein said pivotal lid further comprises a gusset reinforced lifting lip proximal with said top covering member pouring spout for supplementary structural strength when the lid is repeatedly raised with the lifting lip.

13. The insulated brewing pot as recited in claim 1 wherein said basket further comprises a peripheral flange for retaining the basket when resting upon said crescent shaped opening.

14. The insulated brewing pot as recited in claim 1 wherein said basket further comprises a structural matrix defining a plurality of windows.

15. The insulated brewing pot as recited in claim 14 wherein said basket further comprises a strainer positioned inside said basket that is sealed to said structural matrix.

16. The insulated brewing pot as recited in claim 14 wherein said basket strainer further comprises a woven thermoplastic screen having a mesh opening sufficiently small to filter out coffee grounds and tea leafs.

17. The insulated brewing pot as recited in claim 1 wherein said handle, top covering member, lid and basket further comprises thermoplastic selected from the group consisting of polypropylene, acrylic, allyl diglycol carbonate, polycarbonate, polystyrene, polysulfone, polyester sulfone and polyester.

18. An insulated pot for brewing coffee or tea comprising,
    a container having a handle and a top opening,
    a top covering member including a pouring spout removably affixed within said top opening of said container,
    wherein said top covering member having a crescent shaped opening therein leaving a double circular segment gap adjacent to crescent shaped opening,
    a pivotal lid attached to said top covering member, and
    a removable crescent shaped basket disposed within said crescent shaped opening such that with the lid hinged open when coffee grounds or tea leafs are placed therein and hot water is poured thereupon brewing a beverage is achieved accumulating beneath the basket in the container and when poured from the spout the beverage flows through the double circular segment gap without touching the spent coffee grounds or tea leafs within the basket.

* * * * *